(12) United States Patent
Beaton et al.

(10) Patent No.: US 6,310,610 B1
(45) Date of Patent: *Oct. 30, 2001

(54) INTELLIGENT TOUCH DISPLAY

(75) Inventors: Brian Finlay Beaton, Orleans; Colin Donald Smith, Ottawa; Francois Blouin; Guillaume Comeau, both of Hull; Arthur Julian Patterson Craddock, Greely, all of (CA)

(73) Assignee: Nortel Networks Limited (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/985,264

(22) Filed: Dec. 4, 1997

(51) Int. Cl.[7] ........................................ G09G 5/00
(52) U.S. Cl. .............................. 345/173; 345/358
(58) Field of Search ................................ 345/173, 174, 345/358–359, 326, 179, 180, 433, 352–353, 356, 354, 357, 355, 975, 348, 146, 339; 178/18.01, 18.03, 18.04

(56) References Cited

U.S. PATENT DOCUMENTS

| | | | |
|---|---|---|---|
| 4,954,967 | 9/1990 | Takahashi | 345/173 |
| 5,297,253 | 3/1994 | Meisel | 345/357 |
| 5,512,707 | 4/1996 | Ohshima | 84/658 |
| 5,563,996 | 10/1996 | Tchao | 207/521 |
| 5,570,109 | 10/1996 | Jenson | 345/146 |

(List continued on next page.)

FOREIGN PATENT DOCUMENTS

| | | |
|---|---|---|
| 0 156 593 | 10/1985 | (EP) . |
| 0 565 253 | 10/1993 | (EP) . |
| 0 605 945 | 7/1994 | (EP) . |
| 0 609 021 | 8/1994 | (EP) . |
| 0 684 543 | 11/1995 | (EP) . |
| 2 301 217 | 11/1996 | (GB) . |
| 4-060715 | 2/1992 | (JP) . |
| 4-165522 | 6/1992 | (JP) . |
| 4-199416 | 7/1992 | (JP) . |
| 4-237324 | 8/1992 | (JP) . |
| 4-278627 | 10/1992 | (JP) . |
| 5-189150 | 7/1993 | (JP) . |
| 8-307954 | 11/1996 | (JP) . |
| 9-231006 | 9/1997 | (JP) . |
| WO 92 16900 | 10/1992 | (WO) . |
| WO 94 28505 | 12/1994 | (WO) . |

OTHER PUBLICATIONS

Kurtz, Max "Handbook of Applied Mathematics for Engineers and Scientists" pp. 8.24, 12.65–12.66, 1991.*

IBM Technical Disclosure Bulletin, "Scroll Control Box," vol. 36, No. 4, Apr. 1993, pp. 399–403.

IBM Technical Disclosure Bulletin, "Data Interpretation Techniques for Pen–based Computer," vol. 38, No. 9, p. 461, Sep. 1995.

*Primary Examiner*—Richard Hjerpe
*Assistant Examiner*—Francis Nguyen
(74) *Attorney, Agent, or Firm*—Finnegan, Henderson, Farabow, Garrett & Dunner, L.L.P.

(57) ABSTRACT

The system and method consistent with the present invention provides a touch-responsive graphical user interface for electronic devices. The graphical user interface determines a pointer size of the object making contact with a display and activates a function corresponding to the pointer size. The graphical user interface may invoke a wide array of functions such as a navigation tool, draw function, an erase function, or a drag function. The graphical user interface of the present invention may be especially useful in portable electronic devices with small displays.

31 Claims, 15 Drawing Sheets

U.S. PATENT DOCUMENTS

| | | | |
|---|---|---|---|
| 5,590,257 | 12/1996 | Forcier | 707/530 |
| 5,592,195 | 1/1997 | Misono et al. | 345/146 |
| 5,600,765 | 2/1997 | Ando et al. | 345/433 |
| 5,745,116 | 4/1998 | Pisutha-Arnond | 345/358 |
| 5,745,716 | 4/1998 | Tchao et al. | 345/350 |
| 5,748,926 | 5/1998 | Fukuda et al. | 345/326 |
| 5,760,773 | 6/1998 | Berman et al. | 345/347 |
| 5,777,605 | 7/1998 | Yoshinobu et al. | 345/173 |
| 5,790,106 * | 8/1998 | Hirano et al. | 345/173 |
| 5,796,406 | 8/1998 | Shigematsu et al. | 345/358 |
| 5,808,605 | 9/1998 | Shieh | 345/173 |
| 5,809,257 | 9/1998 | Moran et al. | 345/358 |
| 5,812,134 | 9/1998 | Pooser et al. | 345/356 |
| 5,825,352 | 10/1998 | Bisset et al. | 345/173 |

* cited by examiner

INTELLIGENT TOUCH DISPLAY

RELATED APPLICATIONS

This application is related to U.S. patent application Ser. No. 08/985,265, entitled NAVIGATIONAL TOOL FOR GRAPHICAL USER INTERFACE; and U.S. patent application Ser. No. 08/985,261, entitled CONTEXTUAL GESTURE INTERFACE, both of which are filed concurrently herewith, and both of which are hereby incorporated by reference.

BACKGROUND OF THE INVENTION

The present invention relates generally to graphical user interfaces (GUI), and more particularly to a touch-responsive user interface for graphical user interfaces.

Until relatively recently, software-based documents have been primarily viewed and manipulated on desktop or laptop computers with relatively large displays, typically 640×480 pixels or larger. These displays are often large enough to display a full page of standard size page or at least a significant portion of the page. Hence, on-screen graphical menus and controls displayed in window of an application did not greatly reduce the display area for the underlying document. Computers also have peripheral devices such as a keyboard or a mouse to control the display of content information. Thus, viewing and navigating around a single-page or multi-page document have not posed much difficulty.

Due to increasing focus on compactness of electronic devices, however, the displays especially in portable electronic devices are becoming smaller and smaller. Popular electronic devices with a smaller display area include electronic organizers, PDA's (personal digital assistants), and graphical display-based telephones. Also available today are communicators that facilitate various types of communication such as voice, faxes, SMS (Short Messaging Services) messages, e-mail, and Internet-related applications. These products can likewise only contain a small display area.

To enable users to navigate around a full page of content information, these devices typically provide hard-keys for arrows as shown in FIG. 1. The hard-keys, however, not only increase the size but also add to the cost of the devices. Also, hard-keys generally provide limited options for direction of movement, e.g., vertical or horizontal. They generally do not provide the freedom to move in any direction.

Some displays of these devices also require a separate stylus having peripheral technology that requires transmission of electromagnetic pulses or light to the display. These devices often require additional controllers such as buttons on the body or the tip of the stylus for activation. Furthermore, these styli require a power source, either through wire or battery, and their compatibility is generally limited to a specific device.

As shown in FIG. 2, other devices substitute hard-keys with graphical onscreen arrows or scroll bars that are typically used in full-size computer displays. The on-screen scroll bars, however, occupy valuable screen real estate and compound the limitations of small displays. Similar to the hard-keys, the onscreen arrows also generally restrict the navigational movement to horizontal or vertical direction.

In other forms of on-screen GUIs, e.g., pop-up menus, also take up valuable screen space, further reducing the available display area for content information. Additionally, on-screen pop-up menus typically provide available functions in multiple layers, thus requiring a user to move deeply into the hierarchy before reaching the desired function. This is time consuming and renders the GUI cumbersome and ineffective.

Therefore, it is desirable to provide navigation tools that allow small-size devices while maximizing the use of available screen real estate.

It is also desirable to provide tools to navigate within a document at any direction at varying speeds.

It is further desirable to provide navigation tools that can be activated without requiring specific electronic devices.

In addition, it is further desirable to provide an improved GUI that simplifies GUI by recognizing various characteristics of the touch input.

SUMMARY OF THE INVENTION

Systems and methods consistent with the present invention provide a graphical touch-responsive user interface for display devices.

Specifically, a method consistent with this invention of providing a touch-responsive user interface comprises several steps. Initially, the apparatus detects an object making contact with a physical viewing area, and determines a pointer size of the object. Thereafter, the system activates a function corresponding to the pointer size.

A system consistent for this invention for providing a touch-responsive user interface comprises detecting means, determining means, and activating means. The detecting means detects an object making contact with a physical viewing area. The determining means determines a pointer size of the object, and the activating means activates a function corresponding to the pointer size.

BRIEF DESCRIPTION OF THE DRAWINGS

The accompanying drawings, which are incorporated in and constitute a part of this specification, illustrate the invention and together with the description, serve to explain the principles of the invention.

In the drawings.

DESCRIPTION OF THE PREFERRED EMBODIMENT

Figure 1:
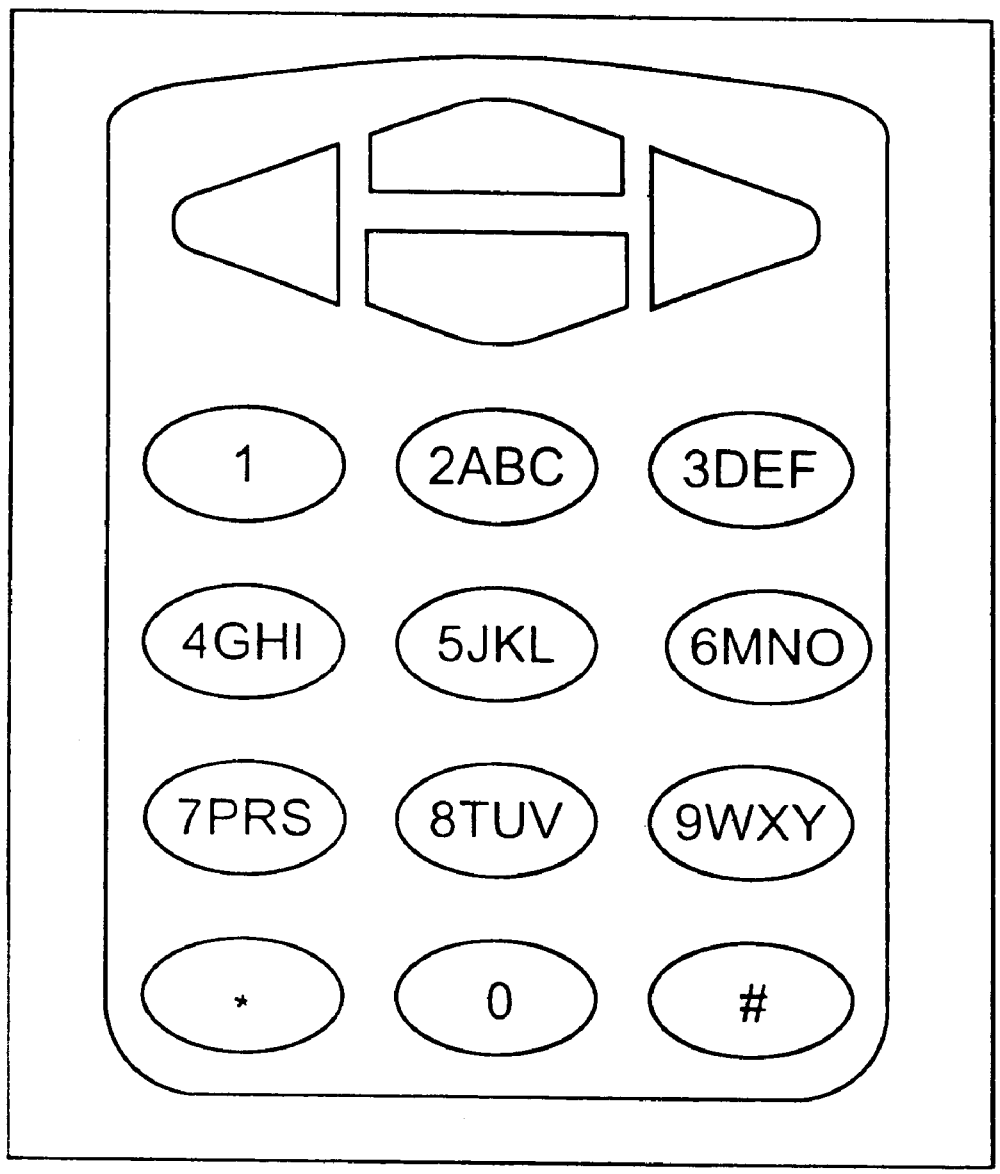
FIG. 1 shows conventional hard-key arrows for navigation control.
Figure 2:
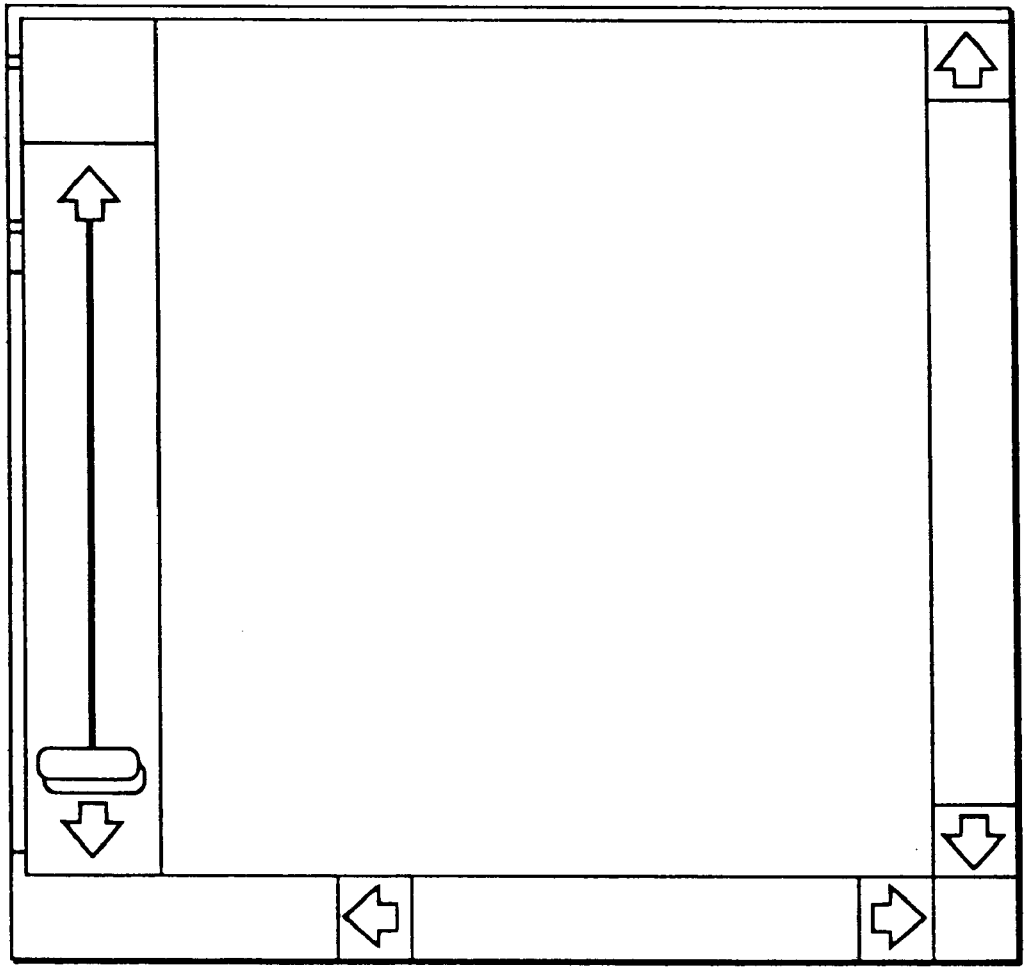
FIG. 2 shows conventional on-screen graphical navigation tool.

Reference will now be made in detail to the present preferred embodiment of the invention, an example of which is illustrated in the accompanying drawings. Where appropriate, the same reference numerals refer to the same or similar elements. The appended claims define the scope of the invention; the following description does not limit that scope.

The graphical navigation tool of the present invention may be implemented in a wide range of electronic devices mentioned above such as electronic organizers, PDA's, and graphical display-based telephones. Although the need to maximize the use of screen real estate is most critical in portable electronic devices with small displays, the present invention can also be implemented in full-size computers or electronic devices. For purposes of illustration, however, the present invention will be explained in detail in a mobile telephone environment.

Figure 3B:
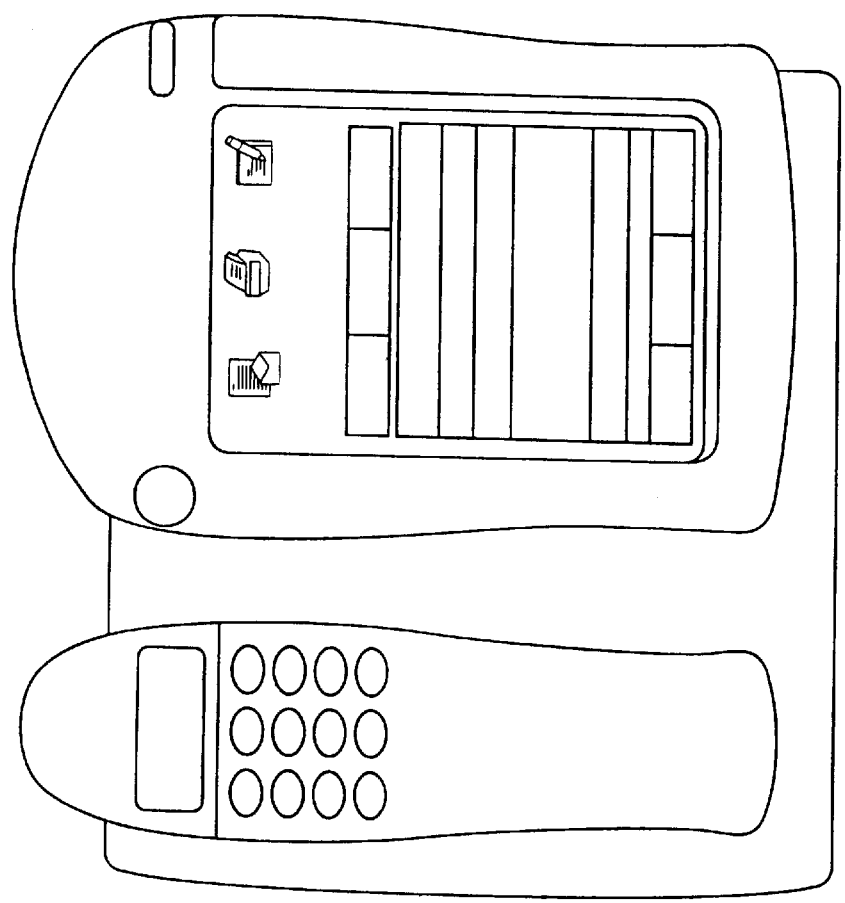
FIGS. 3A–3B are diagrams of an exemplary mobile telephone consistent with the principles of the present invention.
Figure 3A:
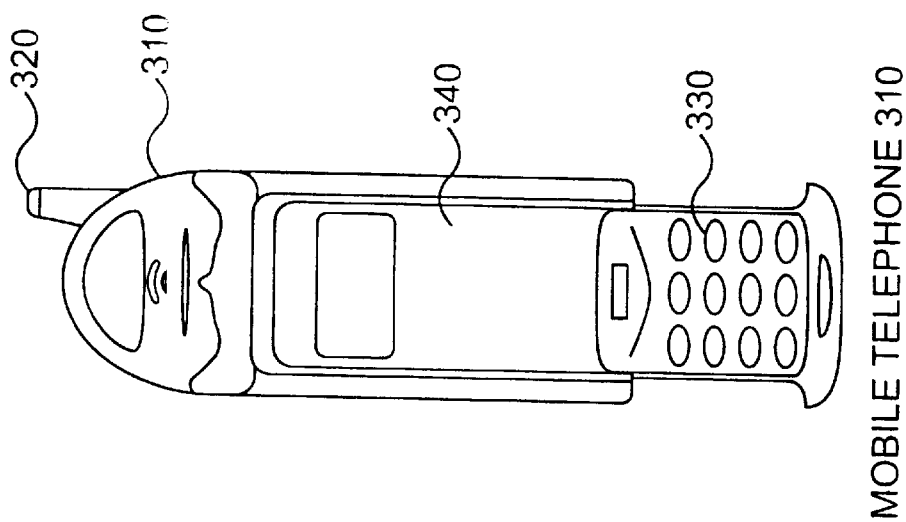
Figure 4:
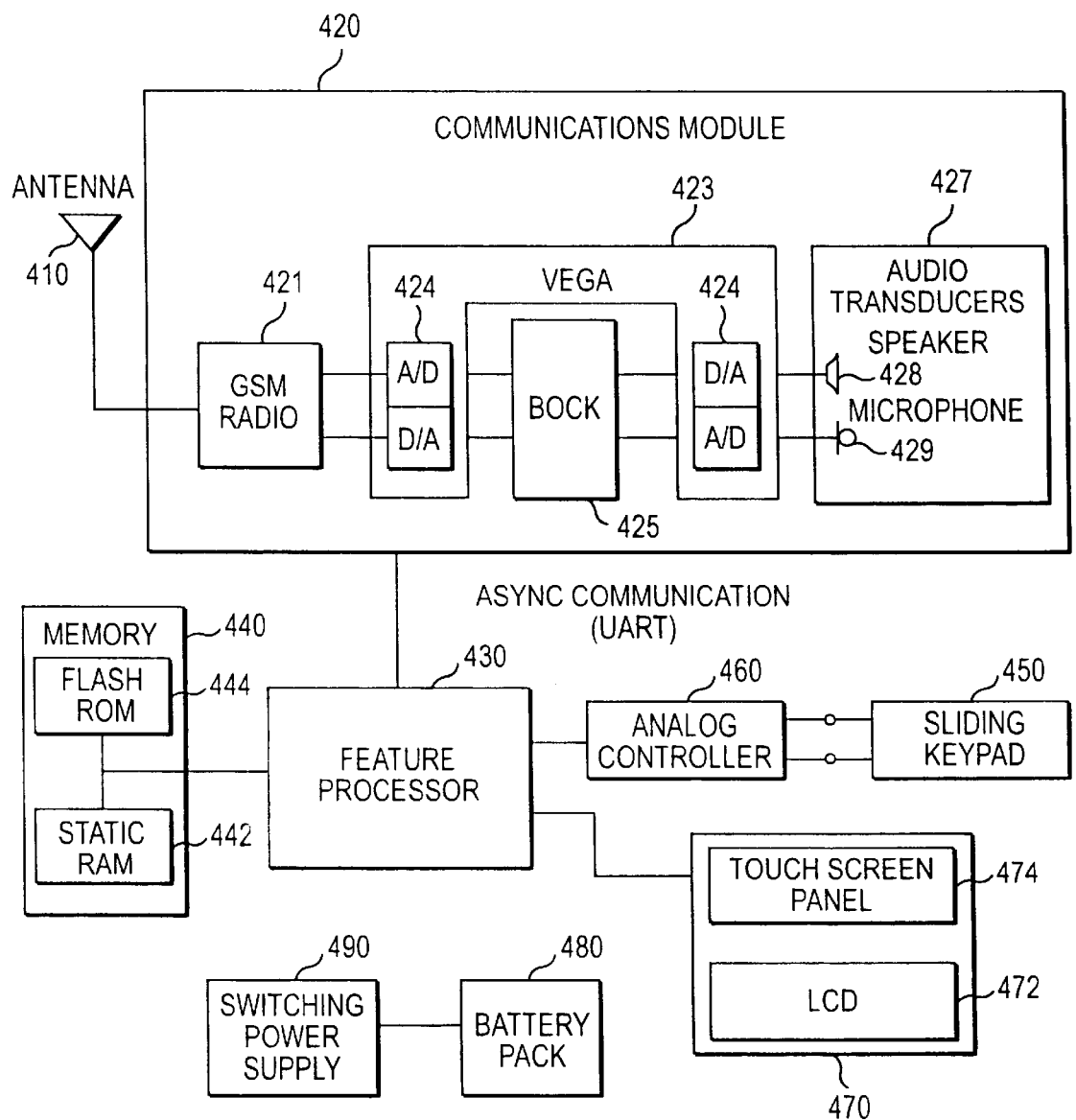
FIG. 4 is a block diagram showing the elements of the mobile telephone of FIG. 3A.

Specifically, FIG. 3A shows a mobile telephone 310 and FIG. 3B shows an exemplary wireline telephone preferably having the graphical navigation tool consistent with the present invention. Mobile telephone 310 includes main housing 210, antenna 320, keypad 330, and display 340. FIG. 4 shows the hardware elements in mobile telephone 310 including antenna 410, communications module 420, feature processor 430, memory 440, sliding keypad 450, analog controller 460, display module 470, battery pack 480, and switching power supply 490.

Antenna 410 transmits and receives radio frequency information for mobile telephone 310. Antenna 410 preferably comprises a planar inverted F antenna (PIFA)-type or a short stub (2 to 4 cm) custom helix antenna. Antenna 410 communicates over a GSM (Global System for Mobile Communications) switching fabric using a conventional voice B-channel, data B-channel, or GSM signaling channel connection.

Communications module 420 connects to antenna 410 and provides the GSM radio, baseband, and audio functionality for mobile telephone 310. Communications module 420 includes GSM radio 421, VEGA 423, BOCK 425, and audio transducers 427.

GSM radio 421 converts the radio frequency information to/from the antenna into analog baseband information for presentation to VEGA 423. VEGA 423 is preferably a Texas Instruments VEGA device, containing analog-to-digital (A/D)/digital-to-analog (D/A) conversion units 424. VEGA 423 converts the analog baseband information from GSM radio 421 to digital information for presentation to BOCK 425.

BOCK 425 is preferably a Texas Instruments BOCK device containing a conventional ARM microprocessor and a conventional LEAD DSP device. BOCK 425 performs GSM baseband processing for generating digital audio signals and supporting GSM protocols. BOCK 425 supplies the digital audio signals to VEGA 423 for digital-to-analog conversion. VEGA 423 applies the analog audio signals to audio transducers 427. Audio transducers 427 include speaker 428 and microphone 429 to facilitate audio communication by the user.

Feature processor 430 provides GUI features and a Java Virtual Machine (JVM). Feature processor 430 communicates with BOCK 425 using high level messaging over an asynchronous (UART) data link. Feature processor 430 contains additional system circuitry, such as a liquid crystal display (LCD) controller, timers, UART and bus interfaces, and real time clock and system clock generators (not shown).

Memory 440 stores data and program code used by feature processor 430. Memory 440 includes static RAM 442 and flash ROM 444. Static RAM 442 is a volatile memory that stores data and other information used by feature processor 430. Flash ROM 444, on the other hand, is a non-volatile memory that stores the program code executed by feature processor 430.

Sliding keypad 450 enables the user to dial a telephone number, access remote databases, and manipulate the GUI features. Sliding keypad 450 preferably includes a mylar resistive key matrix that generates analog resistive voltage in response to actions by the user. Sliding keypad 450 preferably connects to main housing 210 (FIG. 3A) of mobile telephone 310 through two mechanical "push pin"-type contacts (FIG. 4).

Analog controller 460 is preferably a Phillips UCBL 100 device that acts as an interface between feature processor 430 and sliding keypad 450. Analog controller 460 converts the analog resistive voltage from sliding keypad 450 to digital signals for presentation to feature processor 430.

Display module 470 preferably includes a 160×320 pixel LCD 472 with an analog touch screen panel 474 and an electroluminescent backlight. LCD 472 operates in conjunction with feature processor 430 to display the GUI features. Analog controller 460 scans touch screen overlay 474 while feature processor 430 refreshes LCD 472.

Battery pack 480 is preferably a single lithium-ion battery with active protection circuitry. Switching power supply 490 ensures highly efficient use of the lithium-ion battery power by converting the voltage of the lithium-ion battery into stable voltages used by the other hardware elements of mobile telephone 310.

Figure 5:
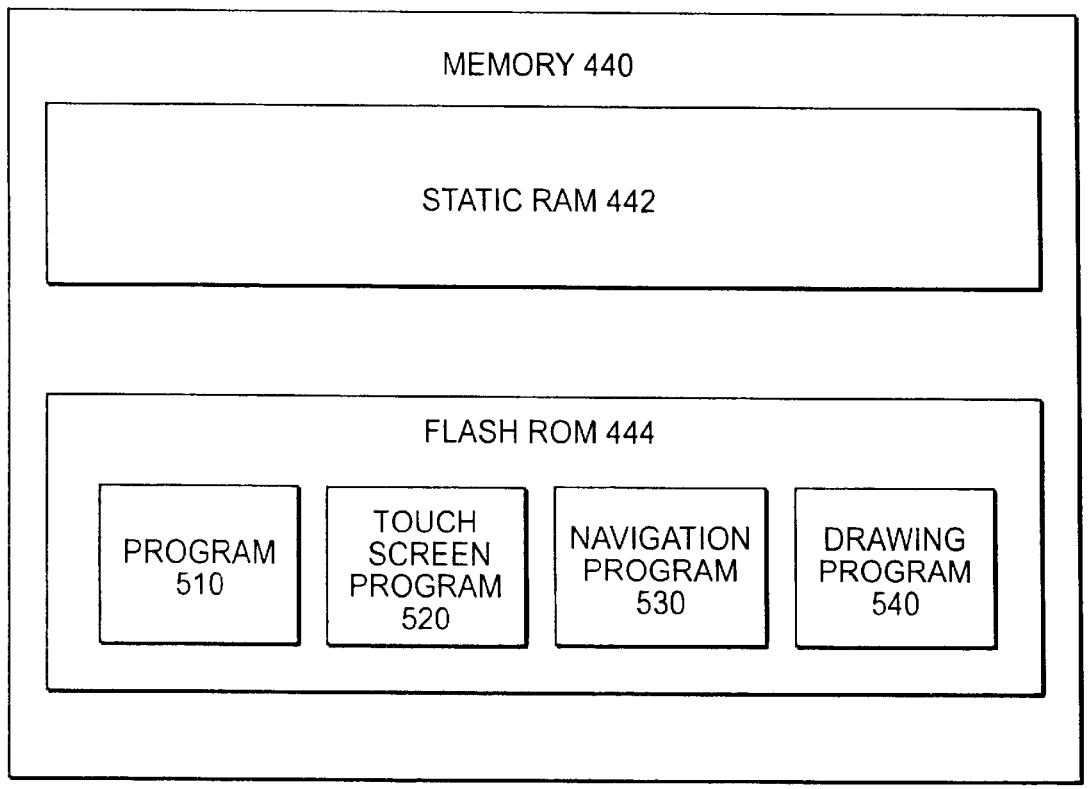
FIG. 5 is a block diagram showing the components of the memory of FIG. 4.

FIG. 5 is a block diagram illustrating the components of memory 440. Static RAM 442 stores data and other information used by feature processor 430. Flash ROM 444 contains various programs including a program 510, a touch screen program 520, a navigation program 530, and a drawing program 540. Program 520, preferably written in languages such as Java, C, or C++ for Macintosh, is a main program overseeing the operation of mobile telephone 310.

Touch screen program 520 facilitates processing of touch input on touch screen panel 474 using a typical touch input algorithm. Navigation program 530 handles navigation of the content information display. Drawing program 540 is a graphical drawing package. Programs 520, 530, and 540 may be one of any commercially available packages or a user-defined feature program or macro.

Figure 6:
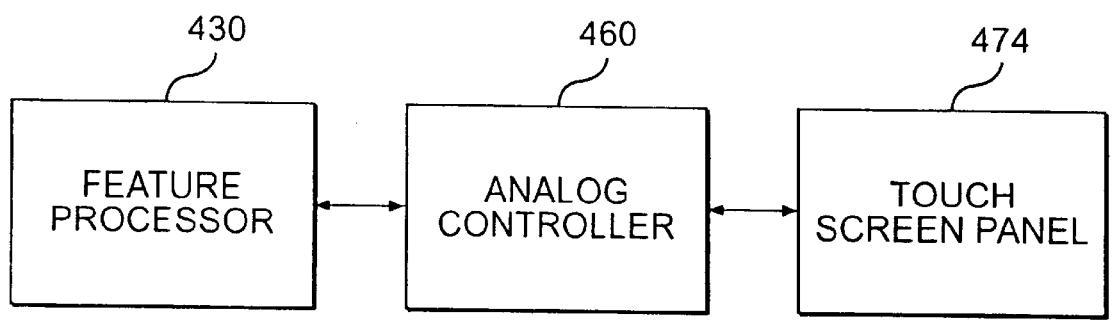
FIG. 6 is a block diagram of touch screen functionalities.

The present invention provides various features through tactile GUI. Initially, LCD 472 displays various GUI features. Referring to FIG. 6, a user touches touch screen panel 474 to provide user input, for example, to navigate around a document or invoke a desired function. Analog controller 460 scans touch screen panel 474 and reads the corresponding analog voltage of touch screen panel 474. Analog controller 460 then converts the analog values into corresponding digital values representing the Cartesian coordinates, which are transmitted to feature processor 430 for processing. The resolution of the touch input depends on the ability of analog controller 460 to discern among multiple levels of analog values, generally defined in bits.

Figure 7B:
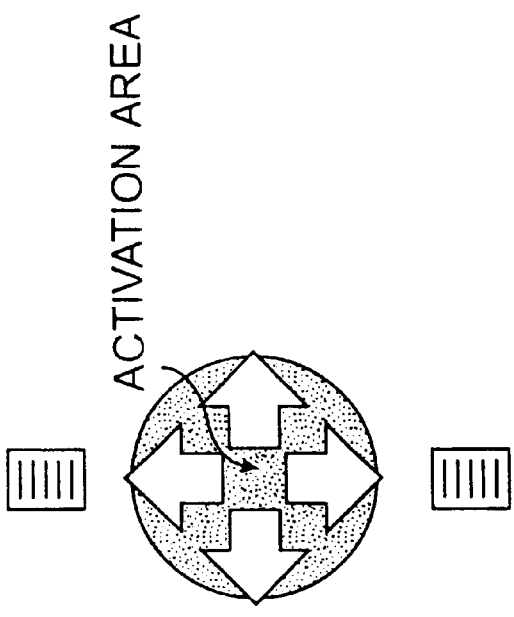
FIGS. 7A–7B show an exemplary inactive and active graphical navigation tool, respectively.
Figure 7A:
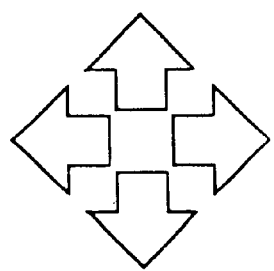
Figure 8:
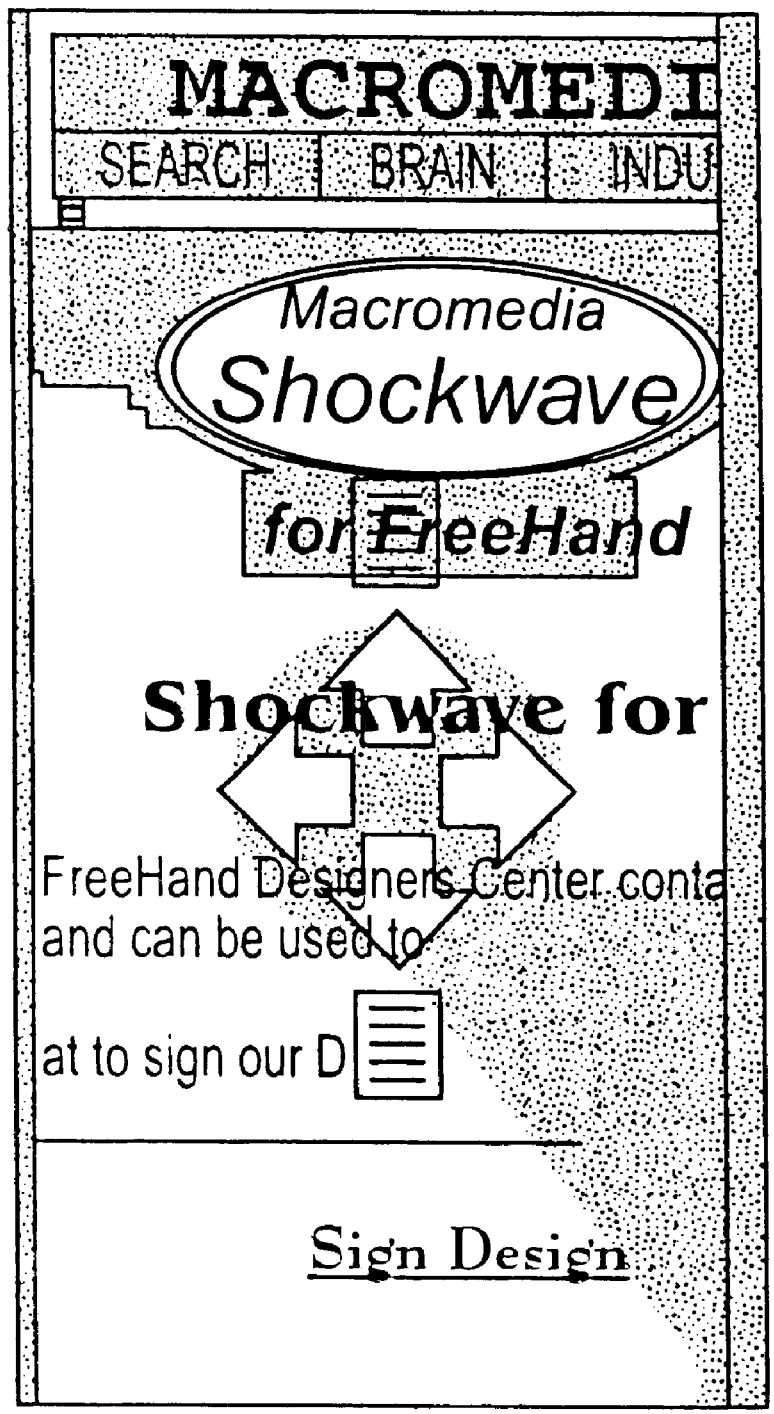
FIG. 8 is a sample screen showing an active navigation tool.

FIGS. 7A-7B show an exemplary graphical navigation tool preferably used to navigate around documents that are too large to view within a single screen of a physical display (hereinafter referred as "viewing area"). The navigation tool may be used to view any kind of document including faxes, Web pages, or e-mail. In one embodiment consistent with the present invention, an inactive navigation tool is displayed and accessible to the user at all times (FIG. 7A). The user may activate the navigation tool by touching and holding the center of the navigation tool for a predetermined time period, for example, one to two seconds (FIG. 7B). An activated navigation tool is preferably transparent to avoid hindering the display of content information in the viewing area as shown in FIG. 8. Alternatively, the navigation star may change colors or other features of its appearance to indicate its active status. A solid line image, for example, may be used in greyscale displays that do not support transparency. The present invention may be designed such that feature processor 430 ignores any touch input on the navigation tool unless the navigation tool has been activated. Instead, the touch input may be interpreted as input to access control buttons in the underlying document, write on the underlying document, or invoke other functions related to the underlying document. This will prevent against unintentional navigation in the viewing window in case the user inadvertently touches touch screen panel 474. In an alternative embodiment, the present invention may accept stylus input to access the underlying document while a finger or non-electromagnetic touch on any part of the navigation tool invokes the navigation function.

Figure 9A:
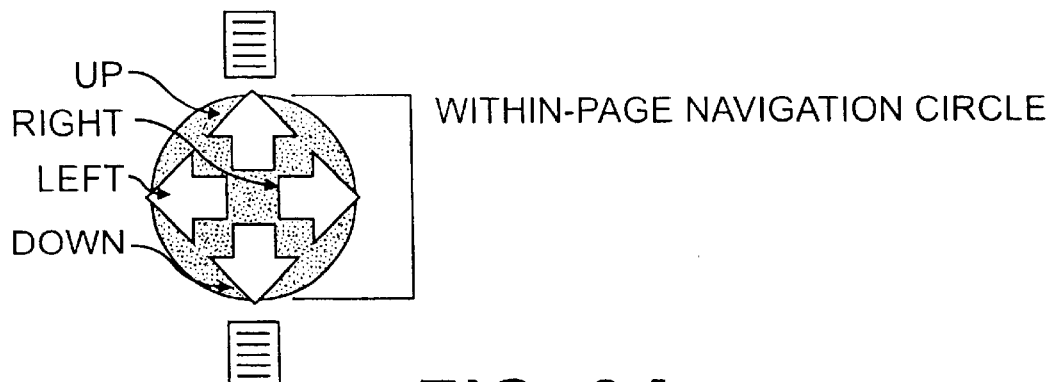
FIGS. 9A–9C show exemplary features of the navigation tool.
Figure 9B:
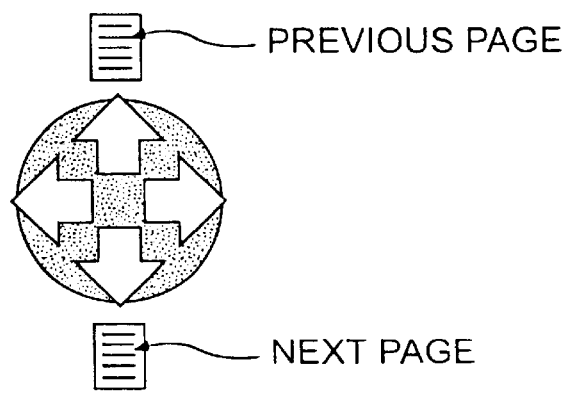
Figure 9C:
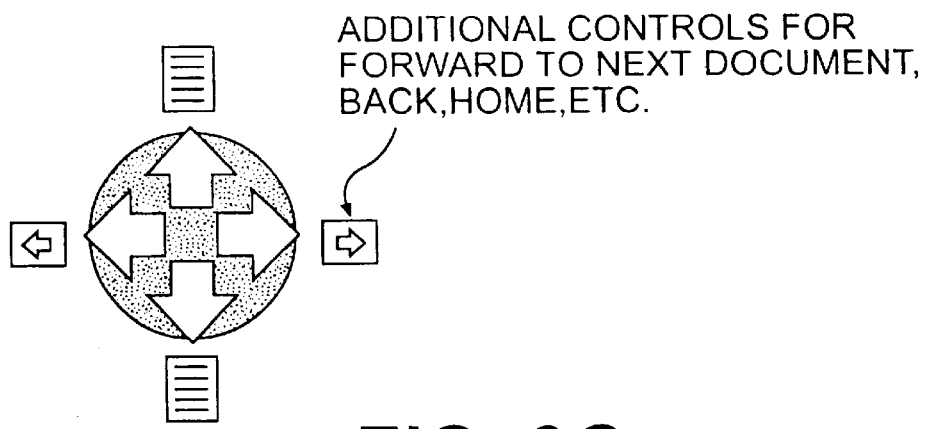

Referring to FIGS. 9A–9C, once the navigation tool is activated, the user may navigate through the document by selecting the graphical arrows, e.g., up, right, left, and down arrows (FIG. 9A), or graphical page icons, e.g., previous or next page (FIG. 9B). One skilled in the art may vary the type and number of graphical tools significantly. For example, the navigation tool may provide graphical representations for forward, next document, back, or home functions (FIG. 9C).

Figure 10C:
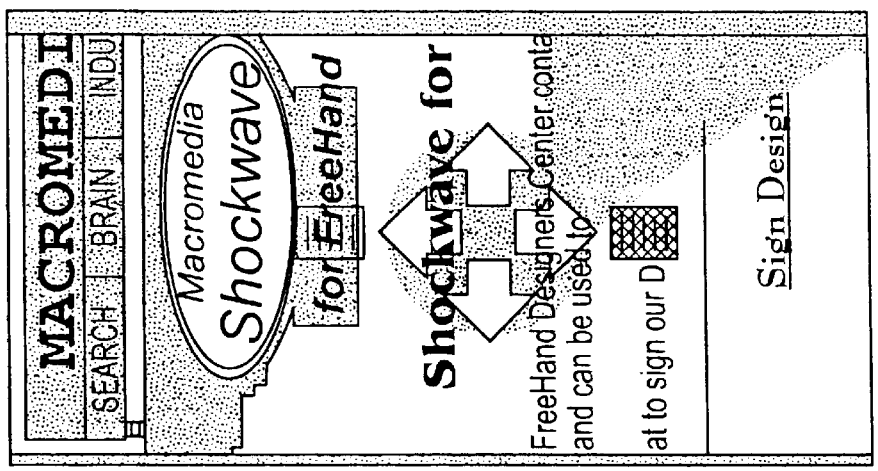
FIGS. 10A–10C are sample screens showing the navigation tool performing various navigation functions.
Figure 10B:
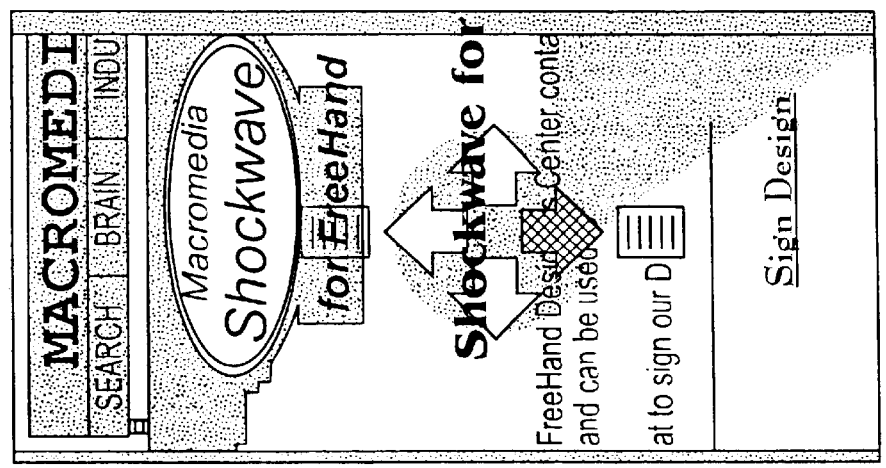
Figure 10A:
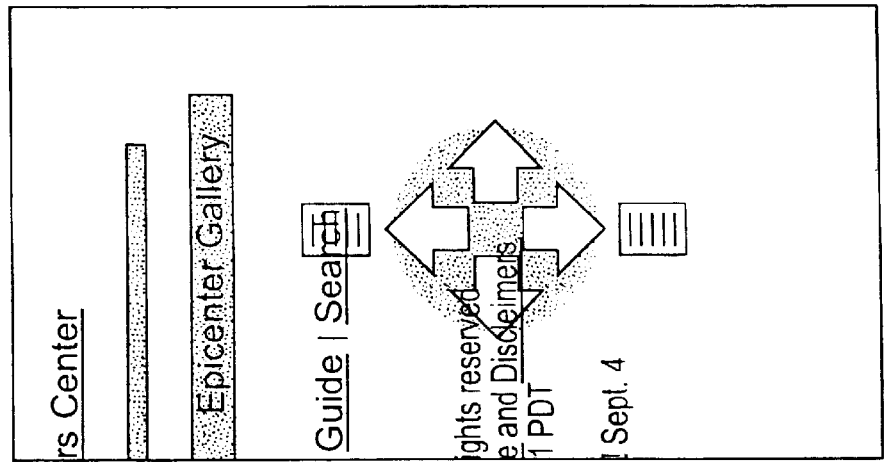

FIGS. 10A–10C show exemplary screen displays while the user is touching the navigation tool. Upon touching the right arrow of the navigation tool, for example, the right arrow is highlighted and navigation program 530 moves the display to the right (FIG. 10A). Similarly, touching the down arrow moves the display down (FIG. 10B). Although the four arrows are presented to guide the users, navigation program 530 supports navigational movement at any direction.

If the user touches an area of the navigation tool equidistant between the up and right arrows, for example, navigation program 530 will move the display towards the upper-right portion of the underlying document at a 45-degree angle. Touching the arrows or any area in between, moves the display in the selected direction until navigation program 530 reaches the edge of the page.

Touching the next page icon moves the viewing window to the next page of the underlying document (FIG. 10C). If a particular document does not have a page corresponding to a previous or next page icon, navigation program 530 will not display the respective previous or next page icons. This would apply to one-page documents, or when the user is at the beginning or end of a multi-page document. In one embodiment consistent with the present invention, a momentary touch of the next page icon causes navigation program 530 to jump to the next page while a continuous touch on the next page icon causes navigation program 530 to continue scrolling through succeeding pages of the underlying document. The previous page icon may embody similar characteristics.

Figure 11A:
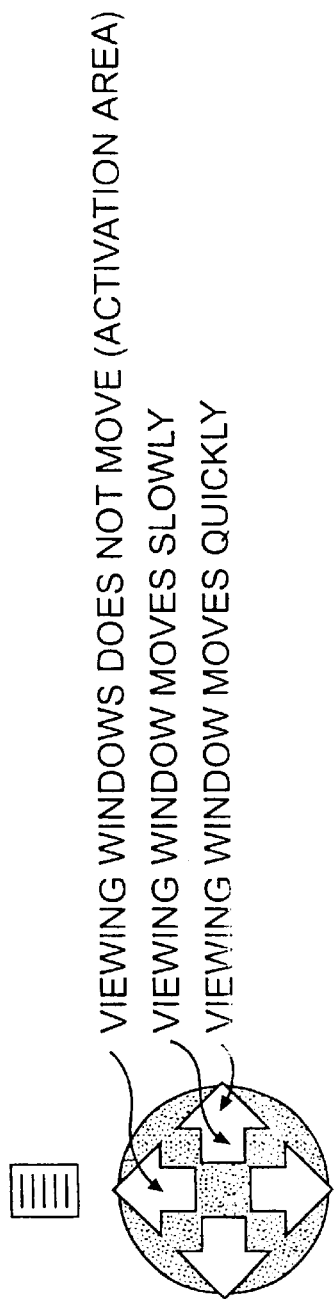
FIGS. 11A–11B show exemplary features of the navigation tool relating to speed of navigation.
Figure 11B:
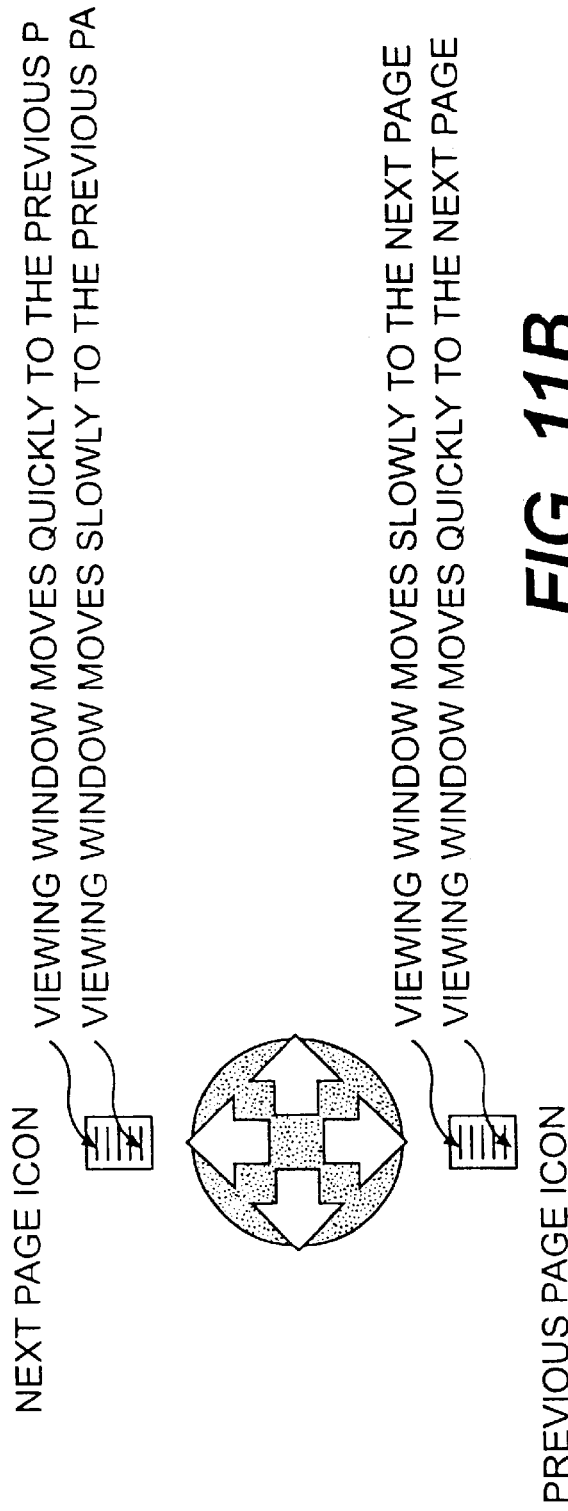

The user may also control the speed of the navigation. As shown in FIG. 11A, the speed of the navigation accelerates as the user touch moves from the center of the circle toward the circumference of the circle, i.e., tip of the arrow. Hence, the viewing window moves slowly when the user touches the blunt end of the arrow located at the center of the circle while the speed accelerates as the user moves the finger towards the tip of the arrow. The speed of navigation, therefore, is determined by the distance of the touch relative to the center of the circle. Likewise, similar principles apply to previous or next page/document icons where a touch closer to the outer edge of the previous or next page/document icons accelerates navigation through the document as shown in FIG. 11B.

Although the exemplary transparent tool discussed above is for navigation, transparent control tools may be implemented for a variety of functions. A transparent tool may, for example, be used for a Web browser application where the controls may be used for appropriate functions such as moving forwards or backwards through different Web pages or returning to home page. One skilled in the art may easily vary the design or the functionality of the graphical navigation tools described above without departing from the scope of the present invention.

In an exemplary embodiment of a navigation tool described above, a finger touch invokes navigational functions based on the feature selected and the location of the user touch. Alternatively, other objects making contact with touch screen panel 474 may invoke other tools or functions. A pointy stylus touch, for example, may invoke a menu with cardinal points representing multiple line widths, colors, or patterns.

In another embodiment consistent with the present invention, tools or application programs may be stored in flash ROM 444 to provide related interfaces to the user. The use of a finger may, for example, invoke tools or dialogues that are finger-touchable and large whereas the use of a sharp stylus may invoke a modified GUI with smaller touch targets. In a yet another embodiment, in a document viewing application normally navigable by a finger touch, use of a sharp stylus may automatically invoke a document annotation application for marking up the underlying document.

As described above, the touch-responsive GUI of the present invention are facilitated though various components including touch screen panel 474, analog controller 460, and feature processor 430. Specifically, analog controller 460 scans touch screen panel 474 to read the corresponding analog voltage of touch screen panel 474 activated by a user touch. Analog controller 460 then converts the analog values into a digital value representing the Cartesian coordinates, which is transmitted to feature processor 430 for processing according to the functionalities of the present invention.

Figure 12:
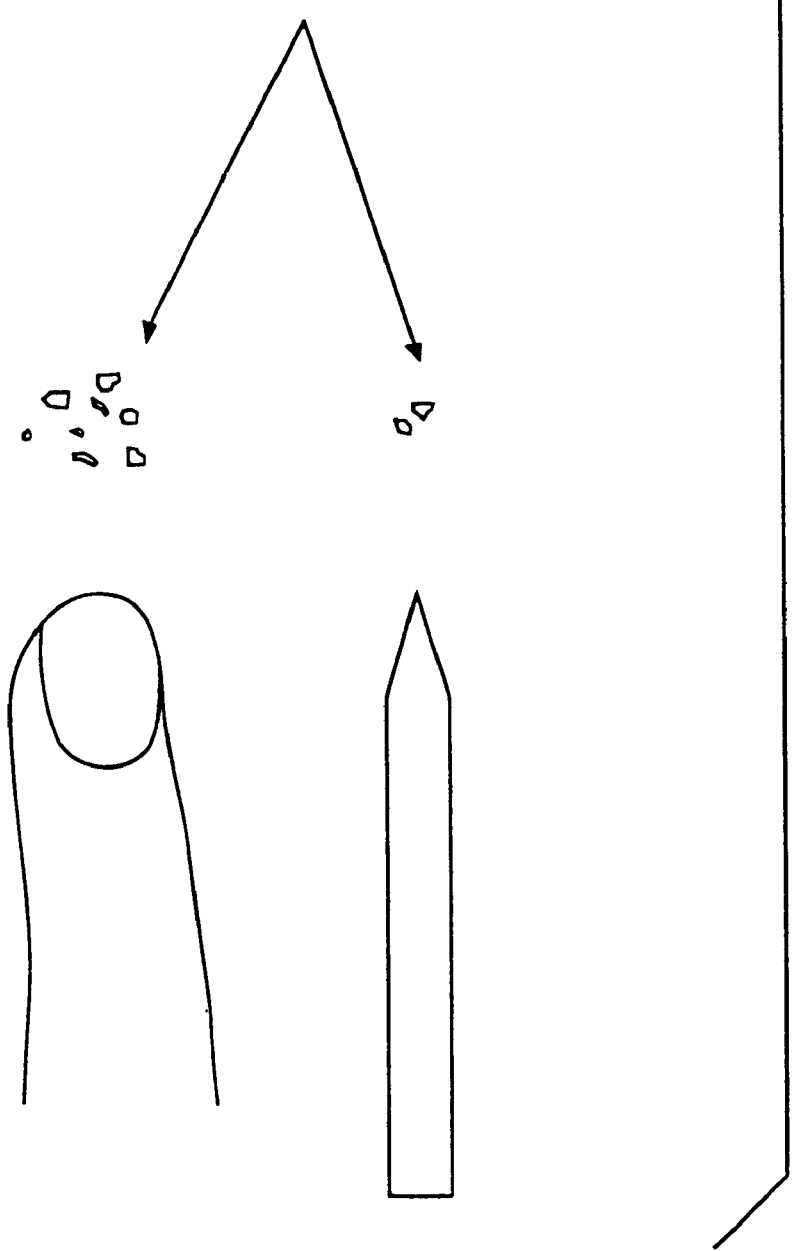
FIG. 12 is a diagram illustrating a touch point distribution.

When a user touches touch screen panel 474, program 510 initiates touch screen program 520 to determine the pointer size of the object making contact with touch screen panel 474 based on a touch point distribution or pointer size of the touch input. As shown in FIG. 12, touch screen program 520 can, for example, determine whether the pointer size of the object is a finger or a sharp object.

Figure 13:
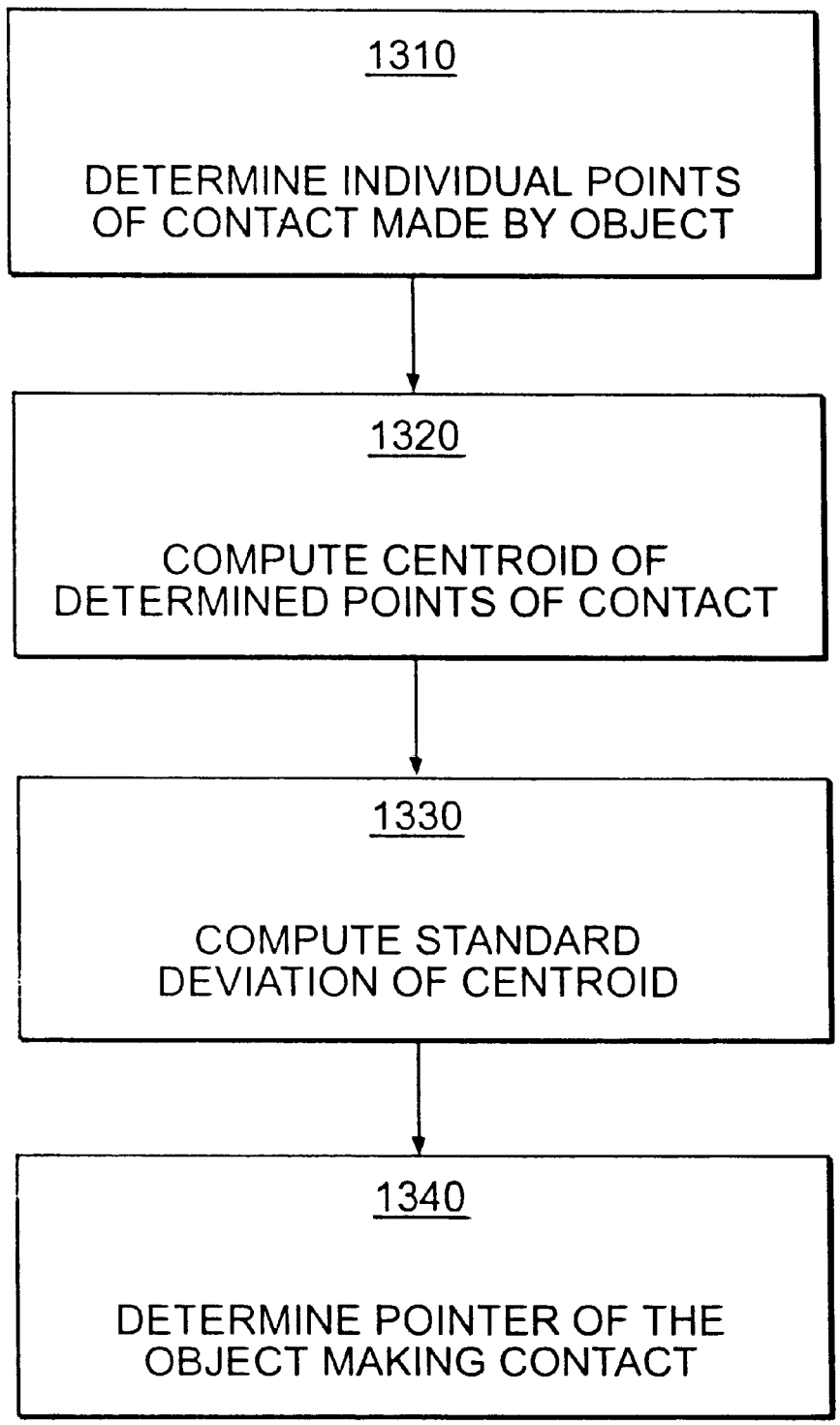
FIG. 13 is a flowchart illustrating the process of determining the size of the object making contact with the viewing area.
Figure 13B:
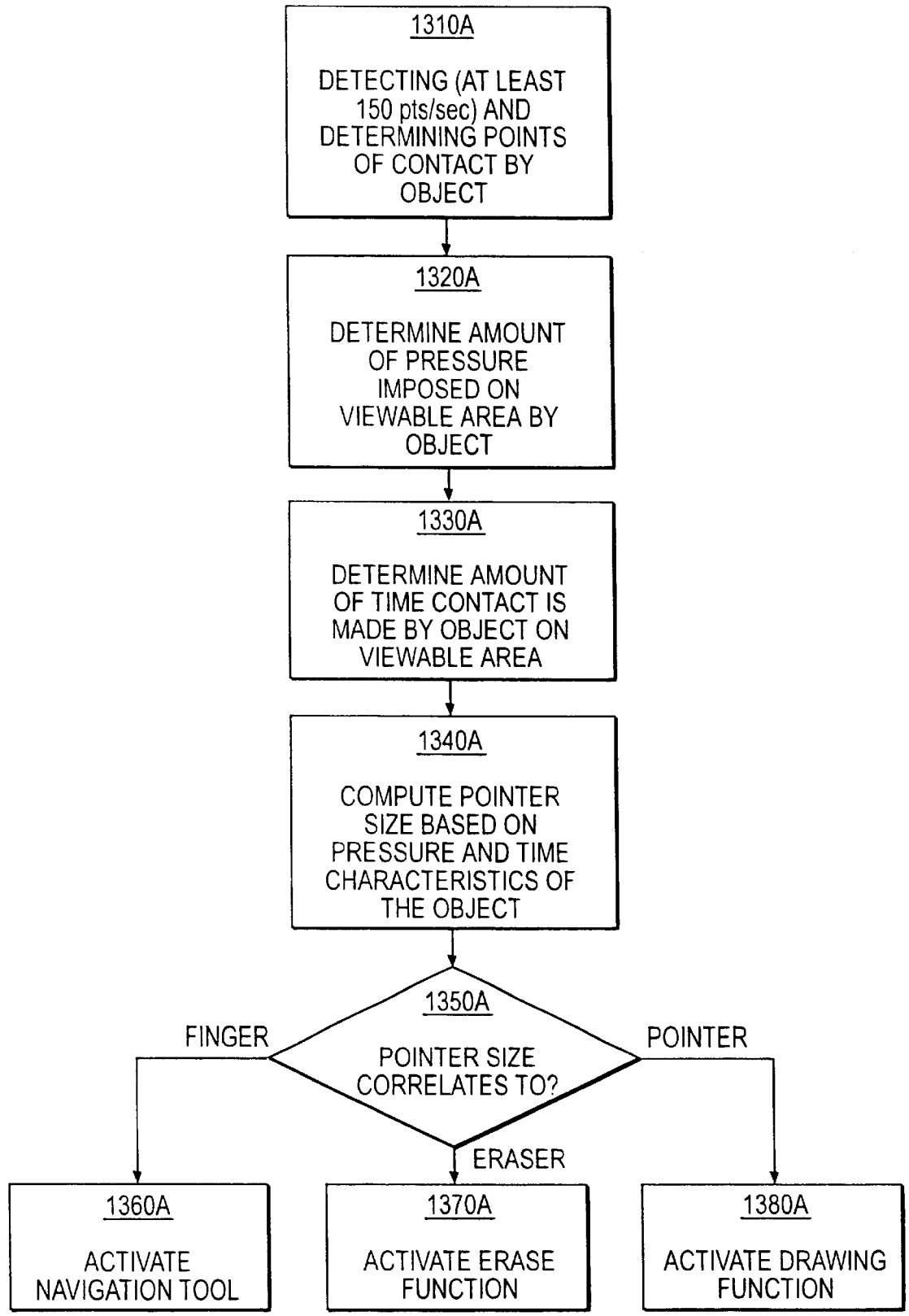
FIG. 13A is a flowchart illustrating an alternate process of determining the size of the object making contact with the viewing area.
Figure 14A:
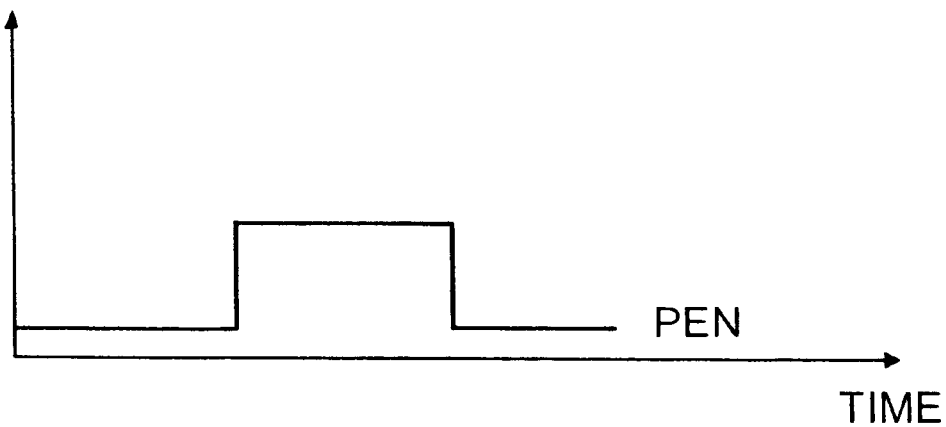
FIGS. 14A and 14B are graphs showing the touch characteristic of a pen and a finger, respectively.

FIG. 13 is a flowchart illustrating the process of determining the size of the object making contact with the viewing area. Touch point program 520 first determines the individual points of contact made by the object (step 1310). It computes a centroid, or other average point, of the determined points of contact (step 1320). Touch program 520 then computes a standard deviation of the centroid as well as the variance (step 1330), and determines the pointer size based on the centroid and the standard deviation (step 1340). These computations are preferably performed on a real-time basis to provide immediate system response to the touch input. In order to achieve optimum results and accuracy, analog touch controller 460 preferably generates 150 points per second or more. Touch program 520 may also use the amount of pressure imposed on touch screen panel 474 as a function of time to determine the size of object. As shown in FIG. 14A, for example, if the amount of pressure increases or decreases sharply at a particular instant in time, touch point program 520 may determine that the touch corresponds to a pen. A finger touch, on the other hand, results in a gradual increase and decrease in pressure as illustrated by a smoother curve in FIG. 14B

Figure 14B:
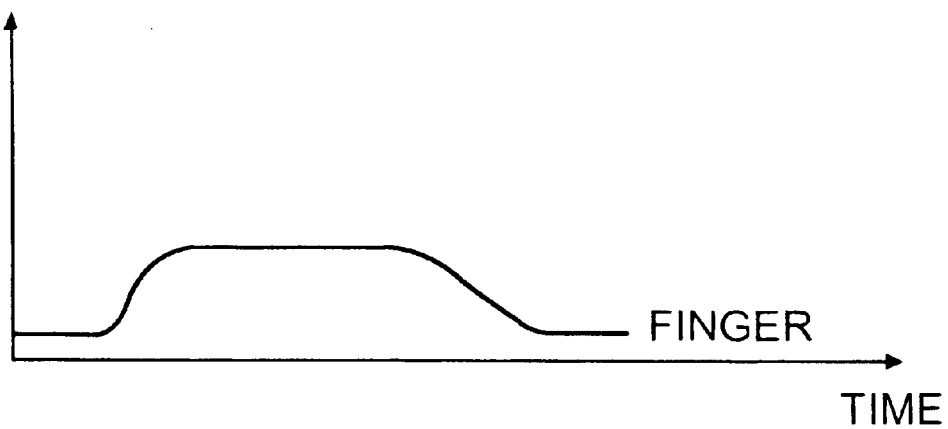

FIG. 13A is a flowchart illustrating the process of determining the size of the object making contact with the viewing area, and implementing selected functions based on the determined size, in accordance with the embodiment described with reference to FIGS. 14A and 14B. Touch point program 520 first detects and determines the individual points of contact made by the object (step 1310A). As described above, touch controller 460 generates at least 150 points per second in order to more accurately detect contact points on the viewable area. Touch program 520 then determines the amount of pressure imposed on the viewable area by the object (step 1320A), and the amount of time the object makes contact with the viewable area (step 1330A). The pressure and time data is utilized by program 520 to compute the pointer size of the object, similar to the exemplary process described in FIGS. 14A and 14B, above (step 1340A).

Program 510 can also be programmed to correlate certain pointer size to certain objects and invoke corresponding functions or tools (step 1350). Such GUI provides a richer, yet simplified interaction between the user and mobile telephone 310. If program 510 determines that the pointer size of the object corresponds to the size of a finger (step 1350A), program 510 may initiate a navigation tool (Step 1360A). If the pointer size corresponds to the size of several fingers, program 510 may invoke a drag function of the navigation tool. On the other hand, if program 510 determines that the pointer size of the object corresponds to size of a sharp point or pen (Step 1350A), program 510 may initiate a drawing tool supported by drawing program 540 (step 1370A). Similarly, if program 510 determines that the pointer size of the object corresponds to size of a pencil eraser (step 1350A), program 510 may initiate an erase function of the drawing tool (step 1380A). One skilled in the art may easily vary the functions or tools initiated by program 510. Additionally, the functions or tools may be commercial software packages, predetermined functions, or user-defined macros.

In addition to using the pointer size to determine the desired GUI, program 510 can also incorporate other characteristics of the user touch, e.g., gestures or movements, to simplify GUI and maximize screen real estate. A gesture recognizing interface extends the ability of the present invention to distinguish between different sized pointers to track gestures and movement of user input based on vector direction and magnitude, all in the context of active user application. This type of contextual gesture interface can infer by context, the implement, and the gesture chosen by the user what functions the user wishes to invoke. Accordingly, all these functions are available without menus or scroll bars and do not require additional screen areas to display the functions.

Program 510 recognizes other characteristics of the touch input including the context of the input, namely the task or sub-task applications running when the GUI is invoked. If a user is in a document navigation application, for example, program 510 interprets a quick drag to the right as a next page function. If the underlying task is an editing application, program 510 may interpret the same gesture as a highlight function and highlight a portion of the document touched by the user. Similarly, in graphics application, a quick drag to the right may invoke a drawing tool to draw from the starting point to the ending point of the touch points. In a document viewing application, the same touch may invoke a navigation tool to move the view of the document in the direction of the finger drag.

All of the above functions and features described above focuses on providing intuitive GUIs and minimize the need for users to memorize complicated, hierarchical menus or procedures. Additionally, the present invention maximize available screen real estate while providing a wide array of GUI and tools.

It will be apparent to those skilled in the art that various modifications and variations can be made in the system of the present invention and in construction of this system without departing from the scope or spirit of the invention. Other embodiments of the invention will be apparent to those skilled in the art from consideration of the specification and practice of the invention disclosed herein. The specification and examples should be considered as exemplary only, with the true scope and spirit of the invention indicated by the following claims.

What is claimed is:

1. A method of providing a touch-responsive user interface comprising the steps of:

detecting an object making contact with a physical viewing area;

determining a pointer size of the object, based on a rate of change in the amount of pressure imposed by the object on the physical viewing area; and activating a function corresponding to the pointer size, wherein the determining step includes the substep of:

<determining the pointer size corresponding to a finger; and wherein the activating step includes the substep of:

activating a navigation tool in response to the determined pointer size.

2. The method of claim 1, wherein the determining step further includes the substep of:

determining the pointer size corresponding to a pen, and wherein the activating step further includes the substep of:

activating a draw function in response to the determined pointer size corresponding to a pen.

3. The method of claim 1, wherein the determining step further includes the substep of:

determining the pointer size corresponding to several fingers, and wherein the activating step further includes the substep of:

activating a drag function in response to the determined pointer size corresponding to several fingers.

4. The method of claim 1, wherein the rate of change in the amount of pressure imposed by the object on the physical viewing area indicates that the amount of pressure changed gradually over a predetermined range of time.

5. A method of providing a touch-responsive user interface comprising the steps of:
- detecting an object making contact with a physical viewing area;
- determining a pointer size of the object, based on a rate of change in the amount of pressure imposed by the object on the physical viewing area; and
- activating a function corresponding to the pointer size,
- wherein the determining step includes the substep of:
  - determining the pointer size corresponding to a pencil eraser; and
- wherein the activating step includes the substep of:
  - activating an erase function in response to the determined pointer size.

6. The method of claim 5, wherein the rate of change in the amount of pressure imposed by the object on the physical viewing area indicates that the amount of pressure changed sharply over a predetermined range of time.

7. An apparatus for providing a touch-responsive user interface comprising:
- means for detecting an object making contact with a physical viewing area;
- means for determining a pointer size of the object, based on a rate of change in the amount of pressure imposed by the object on the physical viewing area; and
- means for activating a function corresponding to the pointer size,
- wherein the means for determining includes:
  - means for determining the pointer size corresponding to a finger; and
- wherein the means for activating includes:
  - means for activating a navigation tool in response to the determined pointer size.

8. The apparatus of claim 7, wherein the determining means further includes:
- means for determining the pointer size corresponding to a pen, and
- wherein the activating means further includes
  - means for activating a draw function in response to the determined pointer size corresponding to a pen.

9. The apparatus of claim 7, wherein the determining means further includes:
- means for determining the pointer size corresponding to several fingers, and
- wherein the activating means further includes:
  - means for activating a drag function in response to the determined pointer size corresponding to several fingers.

10. The apparatus of claim 7, wherein the rate of change in the amount of pressure imposed by the object on the physical viewing area indicates that the amount of pressure changed gradually over a predetermined range of time.

11. An apparatus for providing a touch-responsive user interface comprising:
- means for detecting an object making contact with a physical viewing area;
- means for determining a pointer size of the object, based on a rate of change in the amount of pressure imposed by the object on the physical viewing area; and
- means for activating a function corresponding to the pointer size,
- wherein the means for determining includes:
  - means for determining the pointer size corresponding to a pencil eraser; and
- wherein the means for activating includes:
  - means for activating an erase function in response to the determined pointer size.

12. The apparatus of claim 11, wherein the rate of change in the amount of pressure imposed by the object on the physical viewing area indicates that the amount of pressure changed sharply over a predetermined range of time.

13. A method of providing a touch-responsive user interface comprising the steps of:
- detecting an object making contact with a physical viewing area;
- determining a pointer size of the object; and
- activating a function corresponding to the pointer size,
- wherein the determining step includes the substeps of:
  - determining points of contact of the object, by using points of contact data, wherein the points of contact data is generated by an analog controller that generates at least 150 points of contact per second based on the contact made by the object on the physical viewing area,
  - computing a centroid of the points of contact,
  - computing a standard deviation of the centroid, and
  - computing the pointer size based on the centroid and the standard deviation.

14. An apparatus for providing a touch-responsive user interface comprising:
- means for detecting an object making contact with a physical viewing area;
- means for determining a pointer size of the object; and
- means for activating a function corresponding to the pointer size,
- wherein the determining means includes:
  - means for determining points of contact of the object, by using points of contact data, wherein the points of contact data is generated by an analog controller that generates at least 150 points of contact per second based on the contact made by the object on the physical viewing area,
  - means for computing a centroid of the points of contact,
  - means for computing a standard deviation of the centroid, and
  - means for computing the pointer size based on the centroid and the standard deviation.

15. A method of providing a touch-responsive user interface comprising the steps of:
- detecting an object making contact with a physical viewing area;
- determining a pointer size of the object, based on the amount of change in the pressure imposed by the object on the physical viewing area as a function of time; and
- activating a function corresponding to the pointer size,
- wherein the determining step includes the substeps of:
  - determining points of contact of the object, by using points of contact data, wherein the points of contact data is generated by an analog controller that generates at least 150 points of contact per second based on the contact made by the object on the physical viewing area.

16. An apparatus for providing a touch-responsive user interface comprising:
- means for detecting an object making contact with a physical viewing area;
- means for determining a pointer size of the object, based on the amount of change in the pressure imposed by the object on the physical viewing area as a function of time; and means for activating a function corresponding to the pointer size, wherein the means for determining includes:

means for determining points of contact of the object, by using points of contact data, wherein the points of contact data is generated by an analog controller that generates at least 150 points of contact per second based on the contact made by the object on the physical viewing area.

17. A system for providing a touch-responsive user interface comprising:

a touch screen device having a viewable area for receiving an object that makes contact with the viewable area;

a controller device connected to the touch screen device for detecting contact by the object on the viewable area and for generating at least 150 points of contact per second based on the detected contact;

a computer-readable medium storing a touch screen program; and a processor connected to the controller device and computer-readable medium, for executing the touch screen program, wherein the touch screen program is configured, when executed by the processor, to perform the steps of:

determining points of contact of the object, using the points of contact generated by the controller device;

determining a rate of change in the amount of pressure imposed by the object on the physical viewing area;

computing a pointer size based on the rate of change in the amount of pressure.

18. A computer-readable medium containing instructions for providing a touch-responsive user interface, the instructions when executed by a processor, perform a method comprising the steps:

detecting an object making contact with a physical viewing area;

determining points of contact of the object, by using points of contact data, wherein the points of contact data are generated by an analog controller that generates at least 150 points of contact per second based on the contact made by the object on the physical viewing area;

determining a rate of change in the amount of pressure imposed by the object on the physical viewing area;

computing a pointer size based on the rate of change in the amount of pressure; and activating a specific function corresponding to the pointer size.

19. A method for providing a touch-responsive user interface comprising:

scanning a physical viewing area for contact by an object;

detecting an object making contact with a physical viewing area;

generating contact points associated with the contact made by the object on the physical viewing area at a rate of 150 points per second;

determining points of contact of the object, using the generated contact points;

determining the amount of pressure imposed by the object on the viewable area;

determining the amount of time the object makes contact with the viewable area; and determining a pointer size based on the determined amount of pressure as a function of the determined time.

20. A method for providing a touch-responsive user interface including a touch screen device comprising a physical viewing area, the method comprising the steps of:

presenting a first application tool on the physical viewing area;

presenting a second application tool on the physical viewing area, wherein the second application tool is superimposed on top of the first application tool;

detecting an object making contact on the physical viewing area, wherein the contact is located on the second application tool superimposed on top of the first application tool;

determining the pointer size of the object making contact on the physical viewing area;

activating either the first application tool or the second application tool, based on the determined pointer size of the object.

21. The method of claim 20 wherein the first application tool is a drawing tool, the method further comprising the steps of:

determining that the pointer size correlates to a stylus pointer; and activating the first application tool based on the determination that the pointer correlates to a stylus pointer.

22. The method of claim 20, wherein the second application is a navigation tool, the method further comprising the steps of:

determining that the pointer size correlates to a finger; and activating the second application tool based on the determination that the pointer correlates to a finger.

23. The method of claim 20, wherein the step of determining the pointer size of the object further includes the steps of:

determining the amount of pressure imposed by the object on the physical viewing area;

determining the amount of time the object makes contact with the physical viewing area; and determining the pointer size of the object based on the amount of change in the pressure imposed by the object as a function of a range of time the object makes contact with the physical viewing area.

24. The method of claim 20, wherein the step of determining the pointer size of the object further includes the steps of:

determining points of contact of the object, by detecting at least 150 points of contact per second by the object on the viewing area, computing a centroid of the points of contact, computing a standard deviation of the centroid, and computing the pointer size based on the centroid and the standard deviation.

25. A method for providing a touch-responsive user interface including a touch screen device comprising a physical viewing area, the method comprising the steps of:

presenting a first application tool on the physical viewing area;

presenting a second application tool on the physical viewing area, wherein the second application tool is superimposed on top of the first application tool;

detecting an object making contact on the physical viewing area, wherein the contact is located on the second application tool superimposed on top of the first application tool;

determining points of contact of the object, by using points of contact data, wherein the points of contact data is generated by an analog controller that generates at least 150 points of contact per second based on the contact made by the object on the physical viewing area;

determining the amount of pressure imposed by the object on the physical viewable area;

determining the amount of time the object makes contact with the physical viewable area;

determining a pointer size of the object based on the determined amount of pressure as a function of the determined time; and activating either the first application tool or the second application tool, based on the determined pointer size of the object.

26. A method of providing a touch-responsive user interface comprising the steps of:

detecting an object making contact with a physical viewing area;

determining a pointer size of the object; and activating an application tool corresponding to the pointer size, wherein the determining step includes the substeps of:

determining a rate of change in the amount of pressure imposed by the object on the physical viewing area;

computing a pointer size based on the rate of change in the amount of pressure.

27. The method of claim 26, wherein the step of determining a rate of change in the amount of pressure includes:

determining whether the pressure imposed by the object on the physical viewing area changes gradually or sharply over a predetermined range of time.

28. The method of claim 27, wherein the computing step includes:

associating the pointer size with a stylus pointer when the pressure imposed by the object changes sharply; and associating the pointer size with a finger when the pressure imposed by the object changes gradually.

29. An apparatus for providing a touch-responsive user interface comprising:

means for detecting an object making contact with a physical viewing area;

means for determining a pointer size of the object; and means for activating an application tool corresponding to the pointer size, wherein the means for determining includes:

means for determining a rate of change in the amount of pressure imposed by the object on the physical viewing area;

means for computing a pointer size based on the rate of change in the amount of pressure.

30. The apparatus of claim 29, wherein the means for determining a rate of change in the amount of pressure includes:

means for determining whether the pressure imposed by the object on the physical viewing area changes gradually or sharply over a predetermined range of time.

31. The apparatus of claim 30, Wherein the means for computing includes:

means for associating the pointer size with a stylus pointer when the pressure imposed by the object changes sharply; and means for associating the pointer size with a finger when the pressure imposed by the object changes gradually.

* * * * *